Dec. 24, 1968     B. A. GOUGH     3,417,879

TRANSPORTING SYSTEMS

Filed Oct. 18, 1966     5 Sheets-Sheet 1

Dec. 24, 1968   B. A. GOUGH   3,417,879
TRANSPORTING SYSTEMS

Filed Oct. 18, 1966   5 Sheets-Sheet 3

Fig.5

Inventor
Bernard Alfred Gough
By Lake & Lake

Fig. 6

United States Patent Office 3,417,879
Patented Dec. 24, 1968

3,417,879
TRANSPORTING SYSTEMS
Bernard Alfred Gough, Birmingham, England, assignor to B. A. Gough Equipment Limited, Birmingham, England, a British company
Filed Oct. 18, 1966, Ser. No. 591,065
Claims priority, application Great Britain, Oct. 22, 1965, 44,739/65
12 Claims. (Cl. 214—16)

ABSTRACT OF THE DISCLOSURE

A live storage system including one or more tracks each of which serves as a support affording feed, storage, and discharge stations for a plurality of load bearing pallets. Each track carries a vehicle which runs along the length of the track and is provided with a platform which is movable between a raised position in which it lifts a pallet clear of the track for transport therealong and a lowered position in which it can pass beneath pallets deposited on the track. The vehicle is provided with operating elements which detect the presence of pallets on the track, the position of the vehicle on the track, and the position of the platform, and these operating elements actuate a control circuit which causes the vehicle to proceed selectively through either of two cycles of operation so that pallets are transferred from the feed station to the discharge station, or from the feed station to a storage station and then from such storage station to the discharge station.

---

This invention relates to transporting and storage systems of the type defined below and known as (and hereinafter referred to as) live storage systems, although such systems are sometimes referred to as magazine storage systems.

A live storage system is one which includes supporting means for articles to be stored, such as pallets, and in which the articles being stored move through the system from a feed station to a discharge station so that the first article placed on the supporting means in the storage system will be the first article removed from that storage means.

Known live storages comprise a series of inclined tracks each of which serves as a supporting means and is arranged to take a number of articles, the articles being fed into each track at the upper end thereof (which constitutes a feed station) and removed from the lower end thereof (which constitutes a discharge station). These storages have at least two disadvantages. One is that, if the track is empty, when the first article is placed therein it arrives at the discharge station at a comparatively high speed and may be damaged especially where the article is heavy, say of the order of 1 cwt. (50 kgs.) or more. Moreover, since the slope of each track is not less than 1 in 25 and since each track may, in a typical example, be 200 ft. long there are wasted wedges of space above and beneath the tracks.

It is an object of the present invention to provide a live storage system which overcomes the disadvantages mentioned above.

According to the invention we provide a live storage storage system, comprising an elongated track extending between and into feed and discharge stations; vehicle means movable along the track; supporting means for pallets providing a plurality of storage stations arranged in a row which is above, and generally parallel to, the track; pallet lifting means on the vehicle means and movable between a first, raised, position in which a pallet engaged therewith is lifted off the supporting means, and a second, lowered, position in which the vehicle means can pass under pallets on the supporting means; and control means for controlling movement of the vehicle means along the track and of the pallet lifting means to cause the vehicle means to transfer a pallet (a) from the feed station to the discharge station, (b) from the feed station to a storage station between said feed and discharge stations, and (c) from such storage station to said discharge station.

By "pallets" as used herein we intend to include not only pallets per se but also any form of container, article or load which is capable of being lifted by the lifting means on the vehicle means and moved along the track by the vehicle. The invention will be described in connection with pallets specifically but the word "pallets" is to be construed in its extended sense mentioned above.

The live storage system in accordance with the invention will normally comprise a plurality of tracks each with its associated vehicle means and feed and discharge stations. The tracks may be arranged parallel to one another in a row and there may be a plurality of superposed rows of tracks so that the storage may occupy the whole or the major part of a building.

Preferably, the control means automatically causes the vehicle means to proceed through a first cycle of operations to move pallets successively supplied to the feed station one at a time towards the discharge station and to arrange said pallets on said supporting means in a row extending from the discharge station.

It is one of the features of the invention that the pallets are moved one at a time. Since the pallets may weigh between half a ton and a ton it is more economical to move pallets one at a time than to attempt to move a whole row of pallets simultaneously since much stronger and more powerful lifting arrangements would have to be used in the latter case than where each pallet is moved separately.

Preferably, upon removal of a pallet from the discharge station, the control means automatically causes the vehicle means to proceed through a second cycle of operations to move any pallet in the storage station next to the discharge station (hereinafter called the penultimate storage station) into the discharge station and to move any other pallets on the supporting means towards the discharge station one at a time to re-establish said row of pallets.

An embodiment of the invention will now be described in detail by way of example with reference to a live storage as shown in the accompanying drawings wherein.

Figure 1:
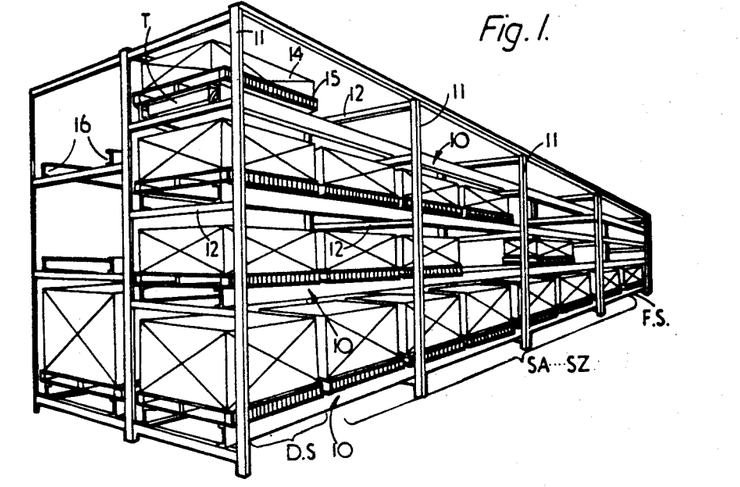
FIGURE 1 is a perspective view of part of a live storage system in accordance with the invention.

Referring now to FIGURE 1, the live storage system illustrated comprises a number of straight, horizontal tracks 10, each track extending between a feed station FS at one end thereof and a discharge station DS at the other. The tracks are arranged in horizontal rows (only two of which are shown) and vertical columns. The rows and columns of tracks form an effectively solid body having rectangular sides without gangways or access roads between the rows and columns. The system may thus substantially fill a warehouse or storage building in which the storage is contained except for gangways giving access to the feed and discharge stations, and there will be substantially no wasted space.

The storage tracks 10 are supported (as shown in FIGURE 1) by a framework comprising uprights 11 and cross members 12. Each track 10 carries a tractor T. The feed and discharge stations comprise the terminal portions of the tracks, which afford a plurality of storage stations SA . . . SZ between the feed and discharge stations FS and DS. Loads 14 on pallets 15 are moved along the track by the tractor T and stored thereon in the manner herein described. It will be appreciated, however, that the loads maybe of any form as referred to previously.

The following description relates to a single track 10 and it will be understood that each track and its associated tractor operate as described below.

Each track 10 comprises two spaced rails 16 (FIGURE 1) of generally channel-section. The rails 16 are arranged with the bases of the channels, hereinafter called webs 17 (FIGURE 7) vertical and the open faces of the channels facing one another and with the sides of the channels, hereinafter called flanges 18 and 19, horizontal. The lower flange 19 of each channel is rather wider than the upper flange 18 thereof. The pallets 15 rest on the upper flanges 18 of the track 10, such flanges 18 thereby serving as a pallet supporting means.

The tractor T (FIGURES 5 to 7) is mounted to run in the track 10 and comprises a chassis or body 20 in which is mounted an electric drive motor M driving through a driving shaft 21 and a worm gear 22 of a reduction gear 23. The worm gear wheel 24 which is keyed as at 25 to an axle 26 extending transversely of the chassis. The axle 26 carries, at its ends, driving wheels 27 which run on the lower flanges 19 of the rails 16. The driving wheels 27 are arranged at the forward end of the body 20, that is to say at the end facing the discharge station. There is a second pair of free running wheels 28 at the other, rear, end of the body mounted on an axle 29.

Figure 7:
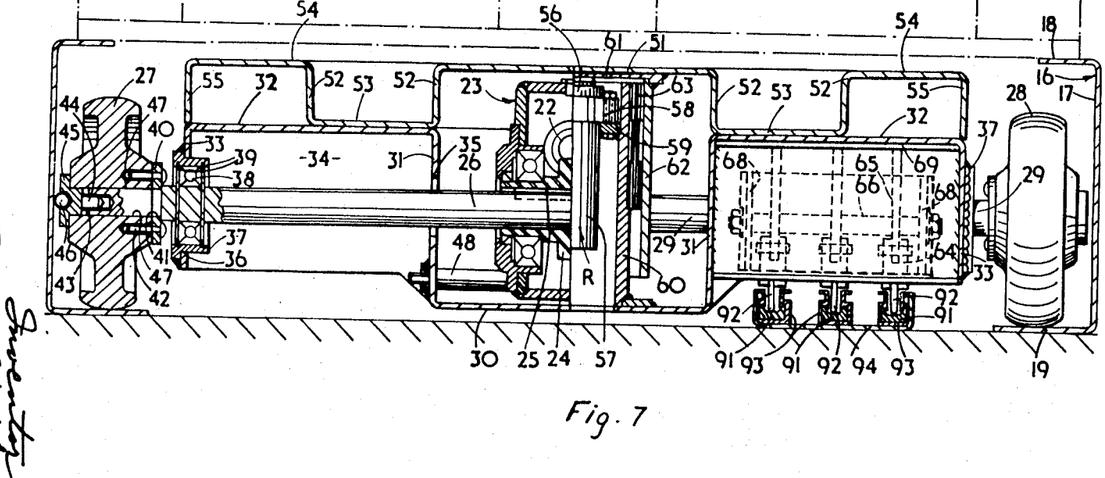
FIGURE 7 is a cross-section on the line 7—7 of FIGURE 6, with the platform shown in its lowered position.

The body 20 of the tractor T comprises a pressing of sheet steel of multiple channel shape in transverse cross-section as best seen in FIGURE 7. The body 20 includes a longitudinally extending central channel having a base 30 and upstanding inner walls 31, this channel serving as a housing for apparatus for driving the tractor. At their upper ends these inner walls 31 are turned outwardly to form two horizontal deck portions 32, and at their outer edges such deck portions are turned downwardly to form side members 33. The body is reinforced by end members 34 welded to the ends of the pressing. The drive motor M and the reduction gear 23 are mounted in the central channel and held in position by rods such as 48.

The inner walls 31 are apertured as at 35 for the passage therethrough of the axles 26 and 29. The side members 33 are also formed with apertures 36 for the reception of bushes 37 having bearings 38 for these axles, the bearings being retained in the bushes by circlips 39.

Wheels 27 and 28 are identical and the manner in which they are secured to their respective axles 26 or 29 is also identical, this being shown in FIGURE 7. Each shaft is machined away at its outer end to provide two flat faces 47 and carries a disc 40 having a central aperture 41 of complementary shape to that of the end portion of the axle so as to be non-rotatable with respect thereto. The wheels are preferably made of a material such as natural or synthetic rubber or a composition material comprising a moulding of a resin and a filler. The wheels are secured to the discs by means of screws 42. This method of transmitting torque to the driving wheels is preferred since it may not be possible to achieve adequate keying from the flat faces 47 alone due to the material of which the wheels are made. At its outer end each axle is formed with a threaded axial bore 43 in which is received a threaded spigot 44 of a bearing block 45 carrying a captive ball 46. The ball 46 engages the inner side of the web 17 of the rail along which the wheel runs and so prevents undue lateral movement of the tractor without giving rise to the frictional resistance to movement which would be incurred if the edges of the wheels themselves were free to come into contact with the webs 17.

A lifting platform 50 is mounted on the upper part of the body 20 and is movable vertically relative thereto. The platform 50 is also a sheet steel pressing of multiple channel section shape in transverse cross-section. It includes a central deck portion 51 which is equal in width to the central channel of the body 20 and a pair of outer deck portions 54. The deck portions 51 and 54 are integrally connected by channel section portions comprising vertical sections 52 and horizontal sections 53. The outside edge portions of the platform 50 are turned down to form dependent flanges 55.

The platform 50 is elevatable by means of a hydraulic ram R (FIGURE 7) which is mounted centrally of the platform, the piston 56 of the ram being connected to the platform 50 and the cylinder 57 of the ram being carried on the body 20. The ram R is mounted by a collar 58 which is bolted to an annular flange 59 welded or otherwise secured within a tube 60 secured in the central channel of the body 20. The piston 56 of the ram acts upon a pad 61 which is welded to the underside to the central deck portion 51 of the platform 50. The pad 61 has welded thereto a dependent tube 62 concentric with and surrounding the inner tube 60. A phosphor bronze bearing 63 is interposed between the two tubes so that the outer tube 62 is free to slide with respect to the inner tube 60 and is guided thereby. The ram R is operated by a hydraulic pump P (FIGURE 3) which draws hydraulic fluid from a reservoir A mounted on the base of the body and feeds it to the ram. A solenoid valve V is included in the hydraulic circuit between the pump P and the ram R whereby the fluid in the ram when it is raised may be allowed to return to the reservoir A and thereby cause the platform 50 to be lowered relative to the body 20.

A channel member 94 having short upstanding walls and extending along the length of the track 10 carries three bus bars 91 and the body of the tractor carries three collectors 62 which engage the bus bars. One of these is a live rail L (FIGURE 4) carrying a positive D.C. voltage (e.g. 24 v.) to provide current for the driving motor M and to the pump motor PM, and one is a return rail (N FIGURE 4) whilst the remaining one (K FIGURE 4) carries a control signal. The bus bars 91 are seated in insulating sleeves 93 having upwardly presented mouths through which the collectors 92 project to contact the bus bars 91. Each of the collectors 92 is carried on a shoe 64 which is pivoted to, and insulated from, an arm 65. Each arm 65 is pivoted on a shaft 66 and is urged by a torsion spring 67 to keep its collector 62 in firm contact with the associated bus bar 61. The shaft 66 is mounted between flanges 68 of a channel section member welded to a cross member 69 which is secured between one of the inner walls 31 and one of the side members 33 of the base 20 of the tractor.

Figure 4:
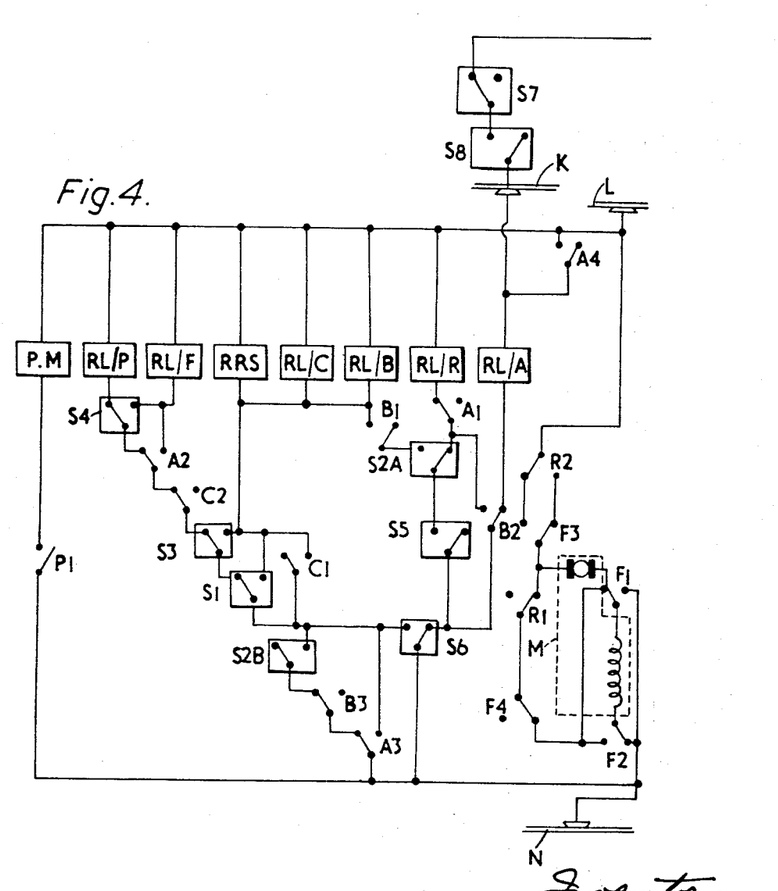
FIGURE 4, is a circuit diagram of the control system for the tractor.
Figure 5:
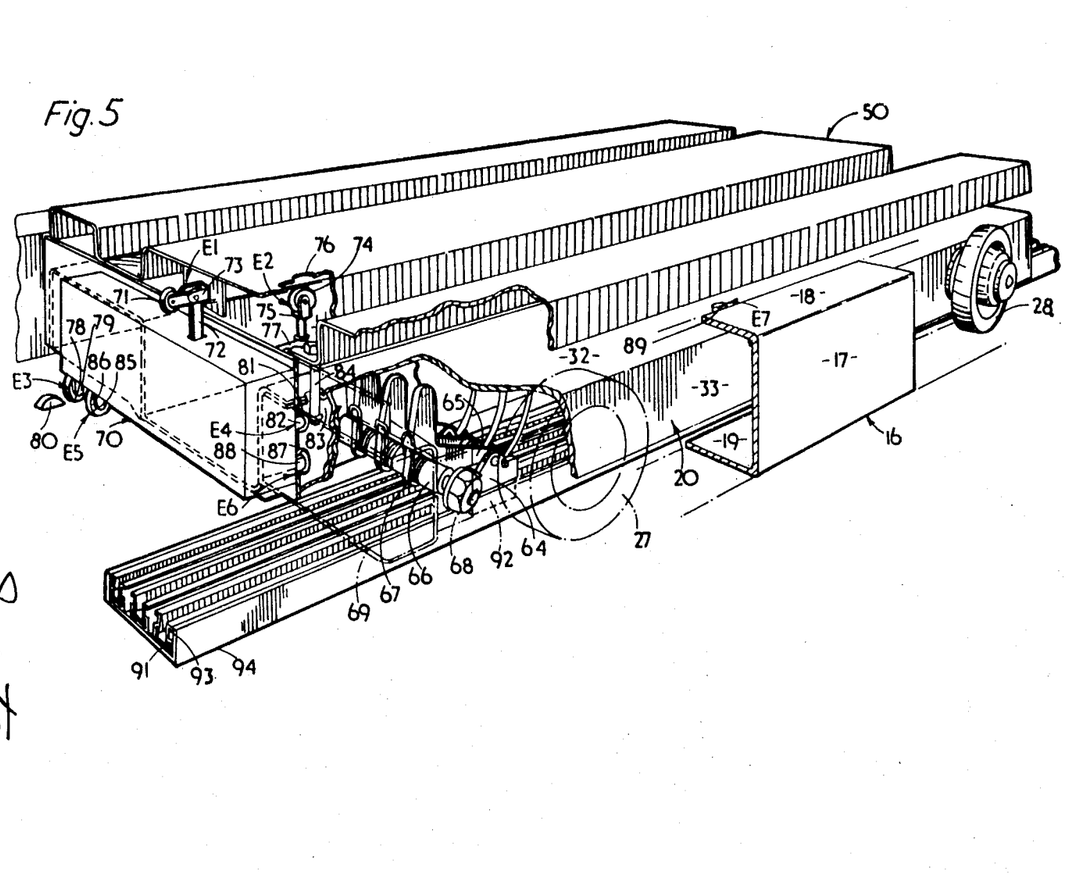
FIGURE 5 is a partially broken away perspective view of a tractor with its platform raised.
Figure 6:
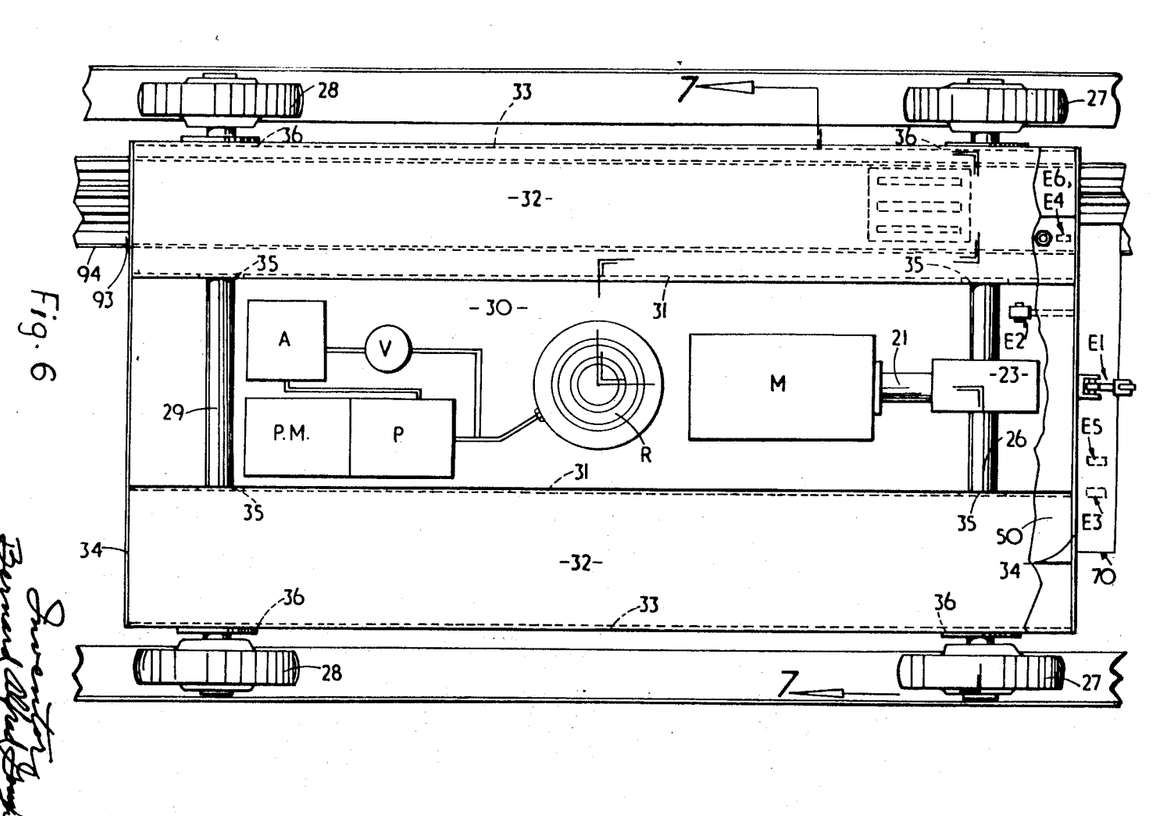
FIGURE 6 is a plan view of the tractor with the platform largely broken away.

The tractor T carries at its forward end a control box 70 detachably mounted on the end plate 34. Associated with the control box are sensing means comprising a plurality of operating elements E1–E6 (FIGURES 5 and 6 in which only mechanical parts are shown) arranged to actuate switches S1 to S6 (FIGURE 4 in which electrical parts are shown). These operating elements are arranged as follows:

Element E1 comprises a roller 71 carried by a bell crank lever 72 which is pivoted at the forward end of the platform 50 by a bracket 73. When the platform 50 is raised the roller 71 is at such a level that it will be engaged by the edge of a pallet resting on the track and be depressed thereby. Such depression of the roller causes the bell crank lever 72 to pivot and consequent displacement of its vertical limb actuates switch S1. When the platform is lowered the roller 71 is sufficiently low to pass beneath any pallets on the track without being depressed. Lowering of the platform has no effect on switch S1.

Element E2 comprises a roller 74 carried on a shaft 75 which projects upwardly through an aperture 76 in the platform when the latter is lowered. The shaft 75 is carried at the end of a lever 77 which is pivoted in, and projects rearwardly from the control box 70. The roller 74 is arranged at the same height as the roller 71, when this is in its raised position, and is depressed when the tractor is beneath a pallet and the platform is lowered. When the platform is raised the roller 74 is below the deck portion of the platform and is thus not depressed when the platform is raised and carrying a pallet. Rocking movement of the lever 77 due to depression of the roller 74 causes actuation of switches S2A and S2B.

Element E3 comprises a roller 78 carried on a plunger 79 projecting downwardly from the control unit and actuated by a co-operating stop element 80 at the discharge station. Upward movement of the plunger 79 actuates switch S3.

Element E4 comprises a roller 81 carried on a plunger 82 projecting rearwardly from the control box 70. The plunger 82 is pressed forwardly to actuate switch S4 by means of an abutment 83 carried by a rod 84 which is fixed to and projects downwardly from the platform 50 through the deck portion of the body 20.

Element E5 comprises a roller 85 mounted similarly to roller 78 on a plunger 86 to actuate switch S5 when the roller 85 is raised by a co-operating stop element 90 (FIGURE 2) in the feed station and similar to element 80.

Element E6 comprises a roller 87 mounted like roller 81 on a plunger 88 to actuate switch S6, when the platform 50 is lowered, by contact between the roller 87 and the abutment 83 on the rod 84.

To provide indications necessary to enable the tractor to function fully automatically two further switches S7 and S8 are provided. Switch S7 is located at the discharge station and is actuated by an operating element E7 comprising a plunger 89 (FIGURE 5) projecting upwardly from the track so as to be depressed by a pallet resting on the track. Switch S8 is located at the penultimate storage station SA to detect a pallet at that station and is actuated by an operating element E8 comprising a stop element 90 (FIGURE 2) similar to stop element 80.

The control box 70 may be detached from the tractor to facilitate maintenance of the electrical components contained therein. However, it is possible to arrange the various switches adjacent to their associated operating elements, if desired, and situate the electrical components in the central channel of the body of the tractor.

The control circuit (FIGURE 4) includes the nine externally operated switches previously referred to, the solenoid RRS of the release valve V, and six relays RL/A, RL/B, RL/C, RL/F, RL/R, RL/P. The functions of the switches are given below. For the purposes of the following description change over switches will be referred to as in their first state when their respective movable contacts are to the left as shown in FIGURE 4, and in their second state when such contacts are to the right.

Switch S1, is a change-over switch which is normally in its first state and is changed to its second state by the depression of the roller 71 forming part of the element E1 mounted on the platform at the front end thereof. This switch senses the presence of a pallet on the track when the tractor is travelling towards the discharge station with the platform elevated, and thereupon causes the tractor to stop, lower the platform and reverse.

Switch S2A, is a changeover switch which is normally in its second state and is changed over to its first state by the depression of the roller 74 forming part of the element E2 mounted on the tractor body at the front end thereof. This switch senses a pallet resting on the track above the tractor, when the tractor is moving towards the feed station and thereupon causes the tractor to stop beneath such pallet.

Switch S2B, is a normally open switch which is closed by the actuation of element E2. It causes the platform to be elevated when the tractor is stopped beneath a pallet by switch S2A and also causes the platform to be elevated when a pallet is deposited at the feed station when the tractor is at rest there.

Switch S3, is a change-over switch which is normally in its first state and is changed over to its second state by the lifting of the roller 78 forming part of element E3 mounted on the tractor body at the front thereof. This switch senses the cooperating stop element 80 arranged at the end of the track at the discharge station, and thereupon causes the tractor to stop and also causes the platform, if elevated, to be lowered.

Switch S4, is a change-over switch which is normally in its first state and is changed-over to its second state by the forward displacement of the roller 81 forming part of the element E4 mounted within the body of the tractor. This switch senses when the ram is fully raised and thereupon stops the pump motor and causes the tractor to travel forward towards the discharge station.

Switch S5, is a normally closed switch which is opened by the lifting of the roller 85 forming part of the element E5 mounted on the tractor body next to element E3. This switch senses the stop element 90 arranged at the end of the track at the feed station and thereupon causes the tractor to stop.

Switch S6, is a change-over switch which is normally in its first state and is changed-over to its second state by the forward displacement of the roller 87 forming part of the element E6 mounted within the body of the tractor. This switch senses when the ram is fully lowered and thereupon causes the tractor to reverse when stopped by S3.

Switch S7, is a normally closed switch which is opened by the depression of the plunger 89 forming element E7 mounted at the discharge station DS. This switch senses the presence of a pallet at this station and in the absence of a pallet (subject to S8) causes the tractor to travel to the discharge station beneath the pallet or pallets in the storage stations.

Switch S8, is a normally open switch which is closed by the depression of a plunger forming element E8 mounted at the penultimate storage station SA adjacent to the discharge station. This switch senses the presence of a pallet at this station, and overrides switch S7 if there is no pallet at the penultimate storage station SA.

Figure 3:
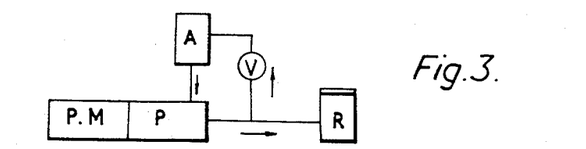
FIGURE 3 shows a hydraulic circuit for controlling raising and lowering of a ram on the tractor.

The solenoid RRS operates the valve V to allow hydraulic fluid to flow from the ram back to the reservoir and thus allow the ram to lower.

The function of the relays is as follows:

Forward drive relay RL/F has four sets of contacts F1–4 and is energized when the tractor is required to travel forward towards the discharge station. Contacts F1 and F2 select the polarity of the field coil, contacts F3 establish the supply of current to the drive motor when the relay is energized, and contacts F4 short out the armature of the drive motor when the relay is de-energized and the reverse drive relay RL/R is also de-energized. When the relay RL/F is energized the field coil is connected for forward movement of the tractor and when this relay is deenergized the field coil is connected for reverse movement.

Reverse drive relay RL/R has two sets of contacts R1 and R2 and is energized when it is required to drive the tractor in the reverse direction i.e. towards the feed station. Contacts R1 short out the armature of the drive motor M when the relays RL/R and RL/F are de-energized and contacts R2 establish the supply of current to the drive motor when relay RL/R is energized.

Pump motor relay RL/P has a single set of contacts P1 and is energized to close the circuit to the pump motor PM so as to raise the ram.

Relay RL/A has four sets of contacts A1–A4, and is energized when there is no pallet at the discharge station DS and one is available at the penultimate storage station SA. Contacts A1 to serve to isolate the reverse drive relay RL/R. Contacts A2 and A3 are in the circuit of the forward drive relay to energize the latter, and contacts A4 establish a holding circuit for relay RL/A.

Relay RL/B has three sets of contacts B1–B3 and is associated with the ram release solenoid RRS. Contacts B1 establish a holding circuit to prevent the ram being raised when the tractor is required to travel forwardly under pallets already on the track. Contacts B2 isolate relay RL/A and provide an alternative circuit to the reverse drive relay RL/R when switch S2A is operated by a pallet which the tractor has lowered onto the track, and contacts B3 isolate switch S2B under these circumstances.

Relay RL/C has two sets of contacts C1 and C2 and is also associated with the ram release solenoid RRS. Contacts C1 establish a holding circuit by-passing switch S1 since this is released as the platform is lowered and the valve could otherwise close before the ram was fully down. Contacts C2 serve to isolate the pump motor relay RL/P and the forward drive relay RL/F.

The operation of the storage system will now be described in detail with particular reference to FIGURES 2 and 4, which respectively show the sequence of operations in stages (a)–(j), and the control circuit with the various switches set in the positions corresponding to stage (a). That is to say, switches S5 and S6 are shown operated and all the remaining switches S1–8 are shown in their normal positions, the tractor being at rest at the feed station FS with the platform down and the track being empty. It will be observed that, under these conditions none of the various circuit elements are energized or operative so that no power is consumed.

Figure 2:
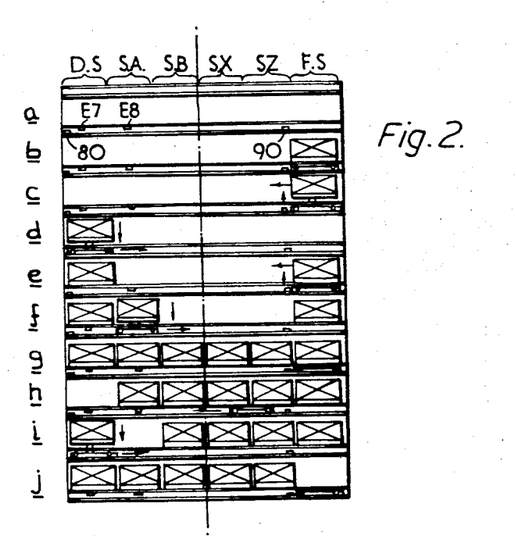
FIGURE 2 is a diagram showing the sequence of operations of a tractor in a single track of the system.

(1)(i) When a pallet is placed on the track at the feed station FS, as indicated at stage (b) of FIGURE 2, the switch S2A changes over to its first state and the switch S2B is closed. The change-over of switch S2A has no effect because it is isolated by switch S5 which is open. However, closing switch S2B establishes a circuit to the pump motor relay RL/P through contacts A3, B3, switches S2B, S1, S3, contacts C2, A2 and switch S4, so that the pump motor contacts D1 are closed and the pump supplies hydraulic fluid to the ram.

(1) (ii) As the ram begins to rise switch S6 changes over to its first state and shunts the contacts A3, B3 and switch S2B. As the pallet is lifted from the track by the platform, switch S2A changes back to its second state and the switch S2B opens but the circuit to the pump motor relay RL/P is maintained through switch S6. Switch S2A is still isolated by switch S5 and additional by switch S6.

(1)(iii) When the ram is fully extended switch S4 is changed over to its second state to connect the chain of switches and contacts S6, S1, S3, C2 and A2 to the forward drive relay RL/F. As shown at stage (c) in FIGURE 2, the paltform is now elevated and holds the pallet clear of the track, and the tractor begins to move forward towards the discharge station DS because relay RL/F is energized, the coil of the drive motor being connected for forward drive by contacts F1 and F2 (changed over from the setting illustrated by energization of the forward drive relay RL/F) and energized via contacts F3 (also changed-over) and R2. As the tractor moves away from the end of the track switch S5 closes, but the reverse drive relay is still isolated by switch S6 which is in its first state because the ram is not down, and the tractor continues to travel towards the discharge station.

(2)(i) When the tractor arrives at the discharge station, stage (d) FIGURE 2, switch S3 is changed-over to its second state by its associated stop element 80 on the track. This energized, via switches S6 and S1, the ram release solenoid RRS and the associated relays RL/B and RL/C. The relay RL/F is de-energized by the change-over of the switch S3 so that the drive motor stops and the contacts F1 and F2 set the coil thereof for reverse travel. The solenoid RRS opens the valve V in the hydraulic circuit and so allows the ram to descend; contacts B1 close and B2 change to their first state and respectively prepare an alternate holding circuit and an alternative circuit to energize the reverse drive relay RL/R, but these circuits are not yet completed; contacts B3 open and isolate switch S2B; contacts C1 change-over to their second state and establish a holding circuit for the solenoid RRS and relays RL/B and RL/C via switch S6; and contacts C2 open and de-energize the forward drive relay RL/F and the pump motor relay RL/P.

(2)(ii) As the ram descends switch S4 is changed back to its first state but is isolated by contacts C2 and switch S3. When the pallet is deposited on the track, switch S2A is again changed to its first state and switch S2B is again closed, but these switches have no effect since, respectively, contacts B3 are open, switch S6 is in its first state and switch S7 is open. When the ram is fully down switch S6 is changed-over to its second state. This completes the alternative holding circuit via switches S5 and S2A and contacts B1, and also completes the alternative circuit to the reverse drive relay RL/R via contacts B2 and A1. Thus the drive motor is energized by way of contacts R2 and F3 so that the tractor moves in reverse towards the feed station.

(2)(iii) As the tractor moves away from the discharge end of the track switch S3 changes back to its first state but the pump motor relay RL/P and the forward drive relay RL/F are still isolated by contacts C2, B3 and switch S6. As the tractor moves from under the pallet it has just deposited at the discharge station switch S2A changes back to its second state and switch S2B opens. Switch S2A thus breaks the holding circuit so that the relays RL/B and RL/C are de-energized and relays RL/P and RL/F are isolated only by switch S2B.

(3)(i) When the tractor reaches the feed station switch S5 is opened so that the reverse drive relay RL/R is de-energized and the tractor comes to rest as in stage (a) of FIGURE 2 if there is no pallet at this station.

(3)(ii) If there is a pallet at the feed station element E2 is operated so that switch S2A is changed over to its first state and switch S2B is closed in addition to the switch S5 being opened. This results in the sequence of operations described under (1)(i)–(iii) occurring without delay; otherwise this sequence is repeated when a pallet arrives at the feed station. In either case the tractor moves forwardly towards the discharge station carrying the pallet, as shown at (c) FIGURE 2.

(4) When the tractor arrives at the penultimate storage station SA switch S1 is changed over to its second state by its associated operating element E1 striking the pallet at the discharge station. (Of course, if the pallet has been removed from the discharge station the sequence of operations described under (2)(i) will occur.) The operation of switch S1 has the same effect as that of switch S3 described under (2)(i) above, but as the platform descends the operating element E1 of switch S1 becomes clear of the pallet in the discharge station with the result that switch S1 changes back to its first state. The ram release solenoid, however, remains energized through the holding circuit established by contacts C1, and switch S6, and the sequence proceeds as in (2)(ii) and (2)(iii) to deposit the pallet at the penultimate storage station as shown at (f) FIGURE 2. As the pallet is deposited at the penultimate storage station SA switch S8 is closed to prepare the circuit for the energizing relay RL/A as described.

(5) Sequences 3 and 4 are then repeated as long as further pallets are placed at the feed station until all the storage stations are full, as shown at (g) FIGURE 2, unless (as hereinafter described) a pallet is removed from the discharge station. It will be appreciated that when the tractor starts to lift a pallet at the feed station and the adjacent storage station SZ is full, switch S1 will be changed-over to its second state as the platform rises so that the platform will then descend because the ram release solenoid RRS is energized by way of switches S6, S1. If the operating element E1 of switch S1, is so arranged that this switch is changed-over before the platform actually begins to lift the pallet, then this pallet remains undisturbed and the platform is lowered. This causes switch S1 to changeback to its first state but, as relays RL/B and RL/C are now energized via the holding circuit established through switch S6 and contacts C1, the platform continues to descend until switch S6 is changed over to its second state and this holding circuit is broken. Whereupon the cycle is repeated, because the alternative holding circuit which would normally be established through contacts B2 and A1 is broken by switch S5 being open. This cycle of raising and lowering the platform will then continue until the pallet at the discharge station is removed. Normally it is expected that the number of storage stations provided would be chosen to be such that the whole track would not be completely filled very often. If, however, such raising and lowering of the platform is considered to be undesirable a switch could be installed in the first storage station SZ adjacent to the feed station FS to detect a pallet in this storage station. Preferably this switch would be arranged to actuate a relay on the tractor via a fourth bus bar when this storage station was full, the relay then opening a set of contacts in the circuit to the pump motor relay RL/P between switch S4 and contacts A2 to prevent the ram being operated until after relay RL/A has been energized.

(6)(i) When the pallet at the discharge station is removed switch S7 closes and, since there is a pallet in the penultimate storage station SA and switch S8 is also closed, relay RL/A is energized providing, or as soon as, the ram is fully lowered so that switch S6 is in its second state and relay RL/B is not energized so that contacts B2 are in their second state. This ultimately causes the tractor to proceed towards the discharge station under the pallets with the platform lowered.

(6)(ii)(a) If the tractor is at rest in the feed station and the storage stations are all full as at stage (g) of FIGURE 2, movement of the tractor towards the discharge station is achieved as follows. As soon as the ram is fully lowered switch S6 changes-over to its second state and the relays RL/B and RL/C are deenergized because the alternative holding circuit is not established as explained under (5). Thus contacts B2 change back to their second state and complete the circuit to relay RL/A. Since switch S2A is in its second state the opening of contacts A1 due to the energization of relay RL/A has no further effect but contacts A2 and A3 are both changed-over to their second states and establish a circuit to the forward drive relay RL/F via switches S1 and S3 and contacts C2, with the result that the tractor moves towards the discharge station.

(6)(ii)(b) If the tractor is at rest at the feed station and not all the storage stations are full, the forward drive relay RL/F is energized immediately switch S7 is closed by the removal of the pallet from the discharge station because switch S6 and contacts B2 are already in their second states as shown.

(6)(ii)(c) If the tractor is in the process of carrying a pallet to a storage station and depositing it, relay RL/A does not become energized until the pallet has been lowered and the relays RL/B and RL/C have been de-energized by the change-over of switch S2A and the opening of switch S2B as described under (2)(iii), when the tractor is travelling back to the feed station and clears the pallet just deposited. At this time contacts B2 change back to their second state and complete the circuit for relay RL/A so that contacts A1 open and the reverse drive relay RL/R is de-energized with the result that the tractor stops. At the same time contacts A2 and A3 change-over to their second states and complete the circuit to the forward drive relay RL/F via switches S1, S3 and contacts C2 so that the tractor changes direction and moves towards the discharge station.

(6)(iii) As the tractor passes under the pallets on the track, as shown at (h) FIGURE 2, the operation of the element E2 changes-over and closes respectively switches S2A and S2B but the reverse drive relay RL/R and the pump motor relay RL/P are not energized because of the setting of contacts A1, A2 and A3. However, when the tractor reaches the discharge station switch S2A changes back to its second state, switch S2B opens (because there is no pallet there) and switch S3 also changes to its second state. This energizes the ram release solenoid RRS and relays RL/B and RL/C, the forward drive relay RL/A being deenergized as contacts B2 change-over to their first state. Thus contacts A1 close to energize the reverse drive relay RL/R through contacts B2 and switch S6 and simultaneously contacts A2 and A3 revert to their first states. Since switch S2A is in its second state the alternative holding circuit previously referred to is not established and as relay RL/A is de-energized contacts A3 are in their first state so that relays RL/B and RL/C are deenergized. To prevent relay RL/A again being energized when contacts B2 revert to their second state as the relay RL/B is de-energized the bus bar K from which relay RL/A collects its current does not extend into the discharge station, contacts A4 forming a holding circuit to keep this relay energized when the tractor enters the discharge station until switch S3 is operated when the tractor reaches the discharge end of the track.

(6)(iv) The tractor now moves out of the discharge station until the tractor is beneath the pallet in the penultimate storage station SA whereupon switch S2A is changed-over to its first state and switch S2B is closed. The change-over of switch S2A cuts off the supply to the reverse drive relay RL/R and the tractor stops. Closure of switch S2B completes the circuit to the pump motor relay RL/P and the ram is raised as described under (1)(i) to lift the pallet at the penultimate storage station SA, the tractor returns to the discharge station as in (1)(ii) carrying the pallet, lowers the pallet at the discharge station as in (2)(i), (ii), and finally the tractor reverses from the discharge station as in (2)(iii), as shown at (i) FIGURE 2.

(6)(v)(a) If there are no more pallets on the track the tractor then returns to the feed station and comes to rest as in (3)(i).

(6)(v)(b) If there are other pallets on the track the tractor continues to travel towards the feed station until it is again beneath one of the pallets so that switch S2A is changed-over to its first state and switch S2B is closed and the sequence described under (6)(iv) is repeated except that the tractor is stopped at the penultimate storage station SA by the operation of switch S1 as described in (4) above. Thus the tractor continues to move all the pallets up one at a time towards the discharge station, and when they are all arranged in a row extending from the discharge station the tractor returns to the feed station, as shown at (j) FIGURE 2.

(6)(v)(c) If the pallet at the discharge station is removed while the tractor is performing the one by one advance of the pallets as described in (6)(v)(b) sequence (6)(ii)(c) again comes into operation when switch S7 closes due to the removal of the pallet at the discharge station. The tractor accordingly returns to the discharge station after depositing the pallet it is carrying at the end of the row remote from the discharge station and proceeds to refill the discharge station and again move all the remaining pallets up one at a time.

From the above description it will be seen that the system operates fully automatically.

Typically the system may be designed to carry pallets 3 feet (1 m.) long and the storage track may extend for about 300 feet (100 m.) so that up to 100 pallets can be stored. A typical speed of travel for the tractor is 300 ft./min. (100 m./min.) so that it would take the tractor a maximum of 2 mins. to take a pallet from the feed station to the discharge station and return to the feed station. The time taken to move a full row of pallets up one place when the discharge station was emptied would thus be about 5 or 6 minutes. If the supply rate of pallets to the feed station was likely to exceed one in 5 or 6 minutes it would be possible to arrange a pallet detector switch at the feed station to recall the tractor to empty the feed station providing the discharge station was full. This could be achieved by a further bus bar actuating a relay to override the forward drive relay, but capable of being overriden itself by relay RL/A.

Where the rate of throughput was potentially too high to be dealt with adequately at all times, even with such a modification, it would be possible to split the system into two or more systems in series and having a continuous track. Thus such track may, as shown in outline in FIGURE 8, carry two tractors the first of which (1T) operates between the feed station FS and an intermediate station IS, and the second of which (2T) operates between the intermediate station IS and the discharge station DS. In this way two pallets may be simultaneously moved.

Figure 8:
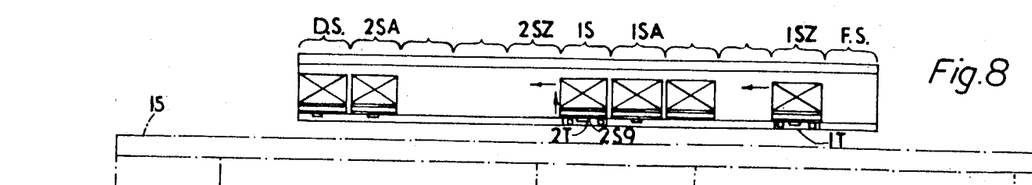
FIGURE 8 shows diagrammatically a modified storage system in accordance with the invention.

To prevent the two tractors colliding the system may be so controlled that the second tractor 2T can only enter the intermediate station when there is a pallet deposited at that station, since at this time the first tractor is prevented from entering. Both parts of the storage system and their tractors and control systems may be identical to that previously described and, for convenience, switches etc. associated with the first part will be given the prefix 1 and those associated with the second part will be given the prefix 2. An extra pallet actuated switch 2S9 is required in the intermediate station IS, which in the absence of a pallet at that station causes a stop element to be raised at the first storage station 2SZ in the second storage system. This stop element is sited to co-operate with the operating element 2E5 of the switch 2S5 of the second tractor to stop this at this storage station when the intermediate station IS has no pallet. The first tractor 1T functions normally and its switch 1S3 is operated by a suitable stop at the intermediate station. As soon as this tractor deposits a pallet at this station it reverses out and the stop element in the storage station 2SZ is lowered to allow the second tractor to enter the intermediate station IS as the first tractor 1T leaves, or after it has left if the second tractor is in operation at the time. Thus the second tractor 2T can never go beyond the intermediate station IS towards the feed station FS and the first tractor can never go beyond the intermediate station IS towards the discharge station DS. Both parts of the system operate exactly as previously described except that the second tractor "homes" to station 2SZ instead of its feed station, which comprises the intermediate station IS, the latter being the discharge station of the first part of the system.

Any number of intermediate stations could be employed with consequent increase in the number of tractors, an extra tractor being required for each extra intermediate station. In addition to affording a system which is purely for storage such a multiple part system could be employed to transfer and store articles between various stages of a multistage process, the stages of the process being carried out at the intermediate stations. In this case the stop member at the first storage station of the next part of the system (e.g. station 2SZ) would be raised not only when the adjacent intermediate station contained no pallet but also while a pallet was there and the stage of the process concerned was being carried out.

A further modification which may be made if desired is to have a pair of tractors, one of which operates from the feed station into the storage stations and serves only to transfer pallets from the feed station to the first vacant storage station, and the other of which serves to convey pallets from the storage stations to the discharge station and also move the pallets up one at a time when the discharge station is emptied. To prevent any collision of the two tractors the control circuits could be arranged to allow the second tractor into the storage stations only when there was at least one pallet present in those stations.

It will be appreciated that all these modifications or variations of the system are in accordance with the invention as defined in the following claims, since they all have the function of storage of pallets (in the broader sense previously defined) and all employ vehicle means which carry the pallets from a feed station (which in some of the modifications may be an intermediate station) and a discharge station (which may sometimes also be an intermediate station, or as in the last described modification, may be the penultimate storage station). It is to be understood that all the stations along the track are storage stations, in as much as pallets can be stored thereat, but the two terminal stations have an additional function of permitting the feeding of a pallet into the system and of allowing a pallet to be withdrawn therefrom.

In this connection, the means for loading and unloading the pallets at the feed and discharge stations respectively may take any convenient form. Thus loading and unloading may be achieved by a low lift pallet or stillage truck if the system includes tracks only at floor level. If the system includes tracks arranged in columns, as in FIGURE 1, then a fork lift truck may be employed. Alternatively roller or other conveyors may be used in either case.

Where the system includes several rows and columns of tracks as shown in FIGURE 1 the feed stations collectively and the discharge stations collectively may be served by a respective handling device which includes an elevatable platform forming an extension of the track which can be aligned with any of the feed or discharge stations the device serves. This elevatable platform may carry a tractor generally similar to those smployed in the storage system to enter the feed or discharge station as appropriate and deposit or remove a pallet respectively. Each handling device may be movable so as to convey its tractor between the storage system and appropriate terminal stations of either a feed conveyor or a discharge conveyor.

What I claim then is:

1. A live storage system, comprising an elongated track extending between and into feed and discharge stations; vehicle means movable along the track; supporting means for pallets providing a plurality of storage stations arranged in a row which is above, and generally parallel to, the track; pallet lifting means on the vehicle means movable between a first, raised, position in which a pallet engaged therewith is lifted off the supporting means, and a second, lowered, position in which the vehicle means can pass under pallets on the supporting means; and control means for controlling movement of the vehicle means along the track and of the pallet lifting means to cause the vehicle means to transfer a pallet (a) from the feed station to the discharge station, (b) from the feed station to a storage station between said feed and discharge stations, (c) from such storage station to the discharge station, the control means comprising means to cause the vehicle means automatically to proceed through a first cycle of operations to move pallets successively supplied to the feed station one at a time towards the discharge station and to arrange said pallets on the supporting means in a row extending from the discharge station towards the feed station, and further means to cause the vehicle means, upon the removal of a pallet from the discharge station, automatically to proceed through a second cycle of operations to move any pallet in the penultimate storage station into the discharge station and to move any other pallets on the supporting means towards the discharge station one at a time to re-establish said row.

2. A live storage system according to claim 1 wherein said vehicle means comprises a single vehicle and the control means further comprises means to cause the vehicle to proceed selectively through the first or second cycle of operations.

3. A live storage system according to claim 2 wherein the control means further comprises means to bring the vehicle to rest at a selected station if all the pallets on the supporting means are arranged in said row.

4. A live storage system according to claim 3 wherein the control means further comprises means to bring the vehicle to rest at a selected station if there are no pallets on said supporting means.

5. A live storage system according to claim 4 wherein the vehicle is driven by a motor mounted thereon, the control means also being mounted on the vehicle.

6. A live storage system according to claim 5 including operating means external to said vehicle means, and sensing means associated with the control means and arranged on the vehicle to co-operate with said external operating means and also with pallets on the supporting means to operate the control means.

7. A live storage system according to claim 6 wherein additional sensing means are provided on the supporting means to detect the presence of a pallet in the discharge station and in the penultimate storage station, such additional sensing means being operatively connected with the control means to interrupt the first or second cycle of operations when a pallet is removed from the discharge station, providing there is a pallet at the penultimate storage station, and to cause the second cycle of operations to be started, or re-started.

8. A live storage system according to claim 6 wherein the sensing means on the vehicle comprises a first sensing element arranged on the lifting means to detect an obstruction while the vehicle is moving towards the discharge station, said first sensing element being operatively connected with the control means to cause the vehicle to stop and to move towards the feed station, the lifting means if in its first position being simultaneously moved to its second position.

9. A live storage system according to claim 8 wherein the sensing means further comprises a first end detection element on the vehicle and said external operating means comprises a stop element at the discharge station to co-operate with said first end detection element to operate the control means to cause the vehicle to stop at the discharge station and to move towards the feed station, the lifting means, if in its first position, being simultaneously moved to its second position.

10. A live storage system according to claim 9 wherein the sensing means further comprises a second sensing element arranged to detect a pallet resting on the supporting means above the vehicle, said second sensing element being operatively connected with said control means.

11. A live storage system according to claim 10 wherein the sensing means further comprises a second end detecting element mounted on the vehicle and said external operating means further comprises a stop element at the feed station to cooperate with said second end detection element to operate the control means to cause the vehicle to stop at the feed station.

12. A live storage system according to claim 11 wherein the control means is mounted on the vehicle as a detachable unit including respective electric switches which are actuated by the first and second sensing elements and the first and second end detecting elements.

References Cited
UNITED STATES PATENTS
2,968,409    1/1961    Jurechko.
3,182,823    5/1965    Chasar ___________ 214—16.4

ROBERT G. SHERIDAN, *Primary Examiner.*

U.S. Cl. X.R.

214—512